United States Patent [19]

Roessler

[11] Patent Number: 4,928,764

[45] Date of Patent: May 29, 1990

[54] WIRELINE TOOL CABLE HEAD OVERLOAD APPARATUS

[75] Inventor: Dennis E. Roessler, Houston, Tex.

[73] Assignee: Halliburton Logging Services, Inc., Houston, Tex.

[21] Appl. No.: 409,897

[22] Filed: Sep. 20, 1989

[51] Int. Cl.[5] .......................... G01L 1/00; E21B 47/12

[52] U.S. Cl. ...................................... 166/250; 73/151; 73/862.38; 73/862.53; 166/66; 166/113; 166/385; 267/70

[58] Field of Search ........... 73/862.38, 862.39, 862.56, 73/862.58, 151, 151.5, 152; 166/385, 250, 66, 65.1, 69, 113; 177/45, 211, 214; 200/243, 250, 61.13, 61.18, 61.14, 61.41, 61.42, 279; 267/70, 73

[56] References Cited

U.S. PATENT DOCUMENTS 3,918,301 11/1975 Baer ................................ 73/862.53

*Primary Examiner*—Jerome W. Massie, IV
*Assistant Examiner*—Ezio Di Sante
*Attorney, Agent, or Firm*—William J. Beard

[57] ABSTRACT

A logging tool cable head for supporting the sonde on a cable is disclosed. It has an upper end which affixes to the cable and a lower end affixed to the sonde. The lower end supports an inwardly directed electrical grounding contact. The upper end supports a rotatable, indexed cam having facing upper and lower shoulders sized and located to bear against the contact, so that electrical contact is indicated on overloading. Indexing of the shoulders relative to the contact is achieved. There is also an adjustable centering spring system which locates the contact relative to the two shoulders.

7 Claims, 1 Drawing Sheet

WIRELINE TOOL CABLE HEAD OVERLOAD APPARATUS

BACKGROUND OF THE DISCLOSURE

The present disclosure is directed to a protective device which protects wireline supporting logging tools from breaking the wireline by excessive pulling on the wireline. It is used in circumstances in which snagging of the cable supported load might accidentally break the cable and risk loss of the cable supported sonde.

Assume that a well has been drilled to a specified depth and has an uncased portion. In that region, there are areas where a protruding, irregular formation in the borehole may snag the logging cable or tool supported thereby. In addition, the tool may be supported on a coil tubing for lowering or raising the well borehole. Ordinarily, this occurs during raising of the tool in the borehole where the logging cable is maintained in tension. Snagging may increase the tension on the cable and thereby break the cable, dropping the logging tool and requiring an expensive fishing job to retrieve the sonde. Of course, the cable will have to be repaired also.

Assume for purposes of illustration that the logging cable is to support a first tool and then what tool is switched, and a second tool is installed. The tools may not weigh the same. Assume for descriptive purposes that one tool weights 200 pounds while the other tool weights 400 pounds. When weight variations are encountered the loading on the cable is different. The present apparatus is a overload protection device which guards against overloading the cable notwithstanding changes in the weight of the sonde affixed to the cable. The present apparatus is a device which connects between the cable and the sonde and which is adjustable to accommodate variations in tool weight as exemplified above, and relates that ability while also providing an adjustable range of loading imparted to the cable resulting from snagging. Assume for purposes of discussion that the cable can tolerate additional loading of 200 pounds above the weight of the tool. In that event, the tool when snagged can be pulled free provided the cable tension does not exceed 600 pounds with a 400 pound tool. If the load is greater than 600 pounds, damage might result. It is difficult to measure cable stress solely by what occurs at the surface. At the surface, the operator is normally equipped with a cable spool or drum with a motor (usually hydraulic) which rotates that spool at a specified rate. The surface located sheave is supported by a load cell monitored structure which cell output is normally indicative of cable tension. However, that is misleading becasue cable tension at the surface is not the same as cable tension at the tool in the borehole. When a cable is broken, it often occurs at the sheave. That is, the cable typically is broken somewhere between the ends. Normally, the cable connector is made to be the weak link in the connective equipment because separation at the cable connector is preferable to parting the cable. When the tool is snagged and held a short moment during retrieval, the cable might break at the sonde where separation is desirable.

The present apparatus is a cable head permitting connection of the cable to the sonde and which provides a signal when axial loads on the cable become excessive. This cable load value is adjustable to accommodate an adjustale peak load setting for snagging and is also adjustable to take into account changes in sonde weight. These adjustments enable a system to be devised which forms an output signal indicative of exceeding an adjustable but specified cable load. This signal is relayed to the surface and permits the operator to reduce cable tension, and thereby protects the cable, sonde and connective cable head therebetween from rupture in the event of excessive pull.

The output of the device is a signal on an electrical conductor through the device which conductor extends along the logging cable to furnish a surface output signal for the operator.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
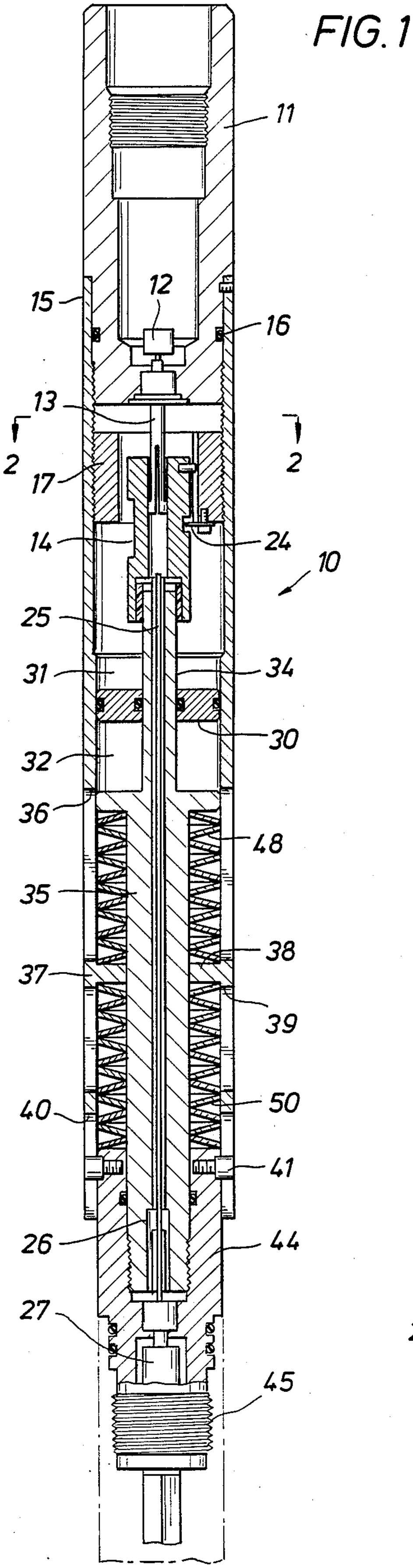
FIG. 1 is a sectional view taken through the length of the cable head of the present disclosure and further illustrating a means for adjusting the permitted cable load acting on the cable head.

Attention is directed to FIG. 1 of the drawings where the numeral 10 identified a cable head connector in accordance with the teachings of the present disclosure. At the top end, it connects with a threaded fitting at the end of a logging cable. An alternate to the cable is a coiled tubing supporting the sonde. At the bottom end, it connects with a mating fitting on a sonde. The cable head 10 is an adjustable tension device which provides an output indication that tension is within a specified range; perhaps better stated, it provides an indication that the axial force is outside an accepted range.

The upper end of the equipment includes a threaded sub 11 having internal threads and is adapted to connect with the lower end of the cable. The cable is provided with at least one electrical conductor which connects through a conventional fitting 12 which is internally recessed and surrounded by the sub to be protected from contact with the fluid that is typically in the borehole. The connector includes a feedthrough 13 positioned in telescoping relationship to a circular profiled cam 14 to be described in detail below. The connector 12 provides electrical connection, and in that sense, the feedthrough 13 and telescoped cam 14 are hot, meaning that they are wired for current conduction.

Figure 2:
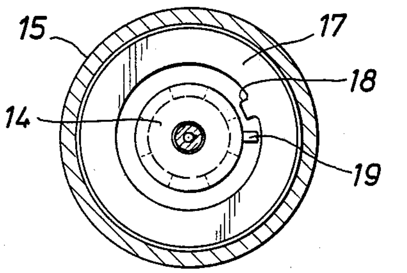
FIG. 2 is a sectional view taken through the apparatus of FIG. 1 illustrating the rotational position of certain components accommodating an adjustment in load.

The sub 11 is threaded to an outer sleeve 15, and leakage along that connection is prevented by a seal 16 therebetween. The sleeve 15 is a load bearing member. It supports the load inparted to the exterior of the cable head 10, while the interior components telescope relative to the sleeve 15. A support sleeve 17 is threaded to the interior of the sleeve 15. It is formed with an axial passage therethrough. It threads on the exterior and is held in a fixed position in the sleeve 15. The sleeve 15 supports the sleeve 17 at a certain oriented position as shown in FIG. 2 of the drawings. The sleeve 17 supports an internally protruding rib 18 which is incorporated for registration purposes. The rib 18 extends along the internal axial passage. This rib has a facing shoulder which abuts an alignment pin 19. The pin 19 is made of nonconducting materials for reasons to be described. It serves as a stop or limit preventing rotation in one direction where the pin 19 is constrained by the facing rib 18.

Figure 3:
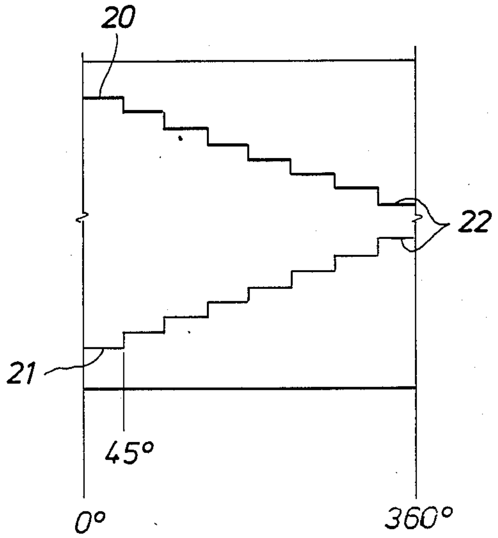
FIG. 3 is a view of shoulder steps on the exterior of a cylindrical component partly shown in FIGS. 1 and 2 wherein an adjustment is made for changes in sensitivity.

The cam 14 has a stepped recess cut in the exterior cylindrical face. This recess is better shown in FIG. 3 of the drawings. The recess has a uniform depth around the cylindrical outer surface of the cam 14, and is defined by upper and lower facing shoulders shown in FIG. 3. The upper shoulder 20 faces the lower shoulder 21. As shown in FIG. 3 of the drawings, they are formed with a series of steps. Each step encompasses 45 degrees of cam rotation. The steps are opposite one another, and have variable spacing between pairs of steps. The closest pair of steps is identified at 22. That pair of steps inscribes a certain spacing. The spacing increases from step to step in a uniform fashion. The eight steps thus comprise eight wider spacings.

The steps are adapted to bracket the radially inwardly directed contact 24 shown in FIG. 1. This contact has a length which enables it to extend into the recess without contact. However, on movement upwardly or downwardly of the cam 14, the contact 24 is brought into grounding contact with either the upper or lower steps. As viewed in FIG. 3, the contact travels along a locus which ideally (in the neutral position) is centered between facing steps. This eight step range of movement for the contact 24 relative to the facing shoulders 20 and 21 in stepwide fashion will be discussed in detail hereinafter.

Returning now to FIG. 1 of the drawings, an insulated conductor 25 is positioned to connect with the feedthrough 13 and telescope therewith. The insulated conductor 25 extends therethrough and terminates at a suitable feedthrough 26 at the lower end of the tool. This enables the conductor to extend into the affixed sonde through a mating feedthrough terminal 27. More importantly, the surrounding sleeve 15 is used as an electrical ground while a signal voltage is placed on the conductor 25 and on the feedthrough 13. This places a signal voltage on the cam 14 which is ultimately positioned opposite the contact 24 for grounding purposes. The contact 24 is affixed to the lower end of the stationary sleeve 17. That contact is maintained at ground potential; contact grounds the cam 14 and forms a signal through the feedthrough 13 and the connected electrical conductor. The function of this will be described in detail hereinafter.

The region around the contact 24 is operated in an oil bath. It is preferably filled with nonconductive oil. The oil is maintained in this region by a piston 30 which defines an oil filled chamber 31 thereabove, and a chamber 32 below which is exposed to drilling fluid. Pressure equalization is accomplished by movement of the piston 30. Moreover, the piston 30 rides on a moveable stem 34 which telescopes in the sleeve 15 and rides up and down with movement. The stem 34 extends below and supports an enlarged mandrel 35. The mandrel is telescoped within the sleeve 15 to the lower end of the sleeve. The mandrel is used to align several springs as will be described.

The sleeve 15 is constructed with an upper set of slots 36. There is a central solid ring 37 integral with sleeve 15 at the lower end of the slots, and that in turn connects with an inwardly directed shoulder 38. The shoulder extends to the interior and encircles the mandrel 35. The shoulder 38 separates the interior compartment for a lower spring 50 from that for an upper spring 48. The solid circular ring 37 is above a middle set of slots 39. These slots are similar to a lower et of slots 40 at the very bottom of the tool. A guide pin 41 is located to extend into the slots 40 and serves as an indexing mechanism to be described.

Preferably, there are eight slots 40 distributed circumferentially around sleeve 15 lower end. The slots 40 are preferably equal in number to the steps shown in FIG. 3 for the shoulders 20 and 21; since there are eight steps, it is preferable to have eight corresponding slots. They serve as a registration mechanism to align the components. The mandrel 35 extends downwardly and connects with a threaded sub 44. The sub is axially hollow and provided with internal threads for joinder to the mandrel 35. Moreover, it is hollow and has a passage for the conductor 25 previously identified. The conductor 25 extends to the lower end of the sub at teh feedthrough 27. Moreover, the sub is provided with a set of threads 45 for easy connection to the sonde which is anchored therebelow. It is hollow so that the feedthrough 27 is permitted to connect to equipment therebelow.

The sub 44 supports the indexing pin 41. Through telescoping movement by relative upward movement of the sleeve 15 and associated rotation, the pin 41 removed from the eight slots 40 and realigned with a different slot and the telescoped parts are restored to the operative position shown in FIG. 1. When this occurs, the relative clearance above and below the contact 24 between the facing shoulders 20 and 21 is changed. It is moved from one pair of facing shoulder steps to another pair of steps. This changes the sensitivity of the device. More will be noted concerning this hereinafter.

The radially directed shoulder 38 extends inwardly to the mandrel 35. This defines upper and lower spring receiving spaces of annular construction. The spring stacks 48 and 50 are referably defined by Belleville washers in the illustrated fashion. This defines a high performance, high quality spring system which centers the transverse shoulder 38. Moreover, the two springs will force the telescoping parts to a centered position. Consider for the moment the spring system when an imbalanced force is achieved. When that occurs, the mandrel 35 is forced upwardly or downwardly as the case may be and when it moves, it moves the cam 14 which is fixedly connected to the stem 34. This motion readjusts the location of the contact 24 between the facing shoulders 20 and 21. If contact is made, a signal is then formed and relayed through the electrical conductor that contact has occurred. This contact is a signal that movement to one extreme or the other has occurred. Movement of the contact 24 relative to the two spring systems 48 and 50 will be more apparent on a description of operation found below.

Use of the cable head 10 of the present disclosure will be more clear on the following example. The sleeve 17 is relatively raised or lowered by rotation of the sub 44 to position the contact 24 at a central or neutral position. It is centered relative to the shoulders 20 and 21 which bracket the contact 24. Sensitivity or the range of travel permitted is then obtained by movement of the pins 41 which indexes one of the eight slots 40. That is achieved while rotating the sub 44 after temporary removal of the pins 41. As the sub 44 rotates, this motion is imparted to sleeve 17 via mandrel 35 and the interaction of rib 18 and alignment pin 19. In less than one revolution of mandrel 35 in either direction, the interaction of the rib 18 and alignment pin 19 imparts the motion of the mandrel 35 to the sleeve 17 thereby adjusting its position along the threaded connection between sleeve 17 and outer sleeve 15. After sub 44 rotation, the pin 41 is then repositioned in a selected slot. Thus, the contact 24 can be tightly confined by the closest pair of steps or can be widely spaced by the most broadly spaced steps. In any event, this position is achieved. As a generalization, the close steps 22 permit the smallest range of travel. This is associated with minimal snagging. In other words, minimal axial travel is permitted should the sonde snag in the borehole. Excessive travel results in electrical contact, and a signal is provided that excessive travel has occurred. By contrast, if wider spacing between the shoulders 20 and 21 is aligned with the contact 24, the sensitivity is reduced and a greater range of travel is tolerated.

The foregoing describes operation of the contact 24 facing the two surrounding shoulders. The position of the contact 24 along the centered position between shoulders 20 and 21 is subject to the springs 48 and 50. The two stacks of spring members are adjusted so that they counteract one another subject to sonde weight. Assume for discussion that the system is installed on a sonde having a specified weight, and then the weight of the sonde is changed. Assume that the present apparatus is connected first to a 200 pound sonde and then switched to a 400 pound sonde. This compresses the upper spring 48, making it shorter. This pulls the cam 14 lower with respect to the contact 24. Readjustment moves the contact 24 centerline by repositioning the sleeve 17. Repositioning and changing of sensitivity involves threading the sub 44 and indexing repositioning of the pin 41 relative to the slots 40. Consequently, the two adjustments are made after the weight change has been implemented. This can be accomplished at the surface before placing the tool in the borehole.

Telescoping movement which does not cause grounding contact is absorbed in the system. The feedthrough 13 telescopes relative to the connected cylindrical cam 14 and in turn, the electrical conductor continues through the cable head 10. Moreover, such movement can be vibratory of chattering as the sonde encounters periodic bumps during upward travel in the borehole. The springs 48 and 50 provide a balancing and centering force, restoring the equipment to the centered position. Centering particularly refers to the position of the contact 24 between steps of the upper and lower shoulders 20 and 21 respectively.

Each use of the present instrument can be adjusted. That is, when the sonde has been retrieved to the surface, the sensivity of the instrument can be adjusted, and the centering can be readjusted in light of changes of the weight of the sonde. That also is subject to variation dependent on the circumstances in which the cable head 10 is installed. The term cable used in the claims refers to a woven cable, cable with one or more conductors, coiled tubing and the like.

While the foregoing is directed to the preferred embodiment, the scope thereof is determined by the claims which follow.

What is claimed is:

1. A cable head adapted to support a sonde in a well borehole which comprises:

(a) an upper end assembly adapted for connection with a cable extending into a well borehole;

(b) a lower end assembly adapted for connection to a sonde to be supported by the cable in the well borehole;

(c) yieldable means joining said upper and lower assemblies together in a fixed but yieldable relationship wherein a controllable and variable load is imparted to the cable thereabove during movement and variations in load on the cable are maintained within specified limits;

(d) said yieldable means further including dead weight adjustable means notwithstanding variations in the dead weight of the load, and said yieldable means includes resilient means permitting movements within a desired range dependent on the adjustment thereof and bracketing a selected relative position of said upper and lower end assemblies;

(e) an electrical contact;

(f) a centrally located cam having a cam surface with an axis of rotation through said cam, said cam axis extending lengthwise of said upper and lower end assemblies;

(g) means controllably rotating said cam to index said cam surface;

(h) means supporting said contact operatively positioned relative to said cam surface for load variant contact to said cam surface; and (i) a circuit connected through said contact to form an electrical signal indicative of excessive load at the cable head.

2. The apparatus of claim 1 including an electrical indicator for forming an electrical signal overloading has occurred, said electrical indicator including an elongate conductor through said upper end member, and insulator means electrically insulating said conductor from grounding contact; and means selectively grounding said conductor only on exceeding a specified load in the cable.

3. The apparatus of claim 1 wherein said yieldable means comprises opposing first and second springs controllably centering said yieldable means to define an initial position of said upper and lower end assemblies.

4. The apparatus of claim 3 wherein said yieldable means includes a relatively movable member bearing against said springs and which is adjustable to vary spring loading.

5. The apparatus of claim 1 wherein said cam surface is a set of stepped shoulders around a cylinder.

6. The apparatus of claim 1 further wherein said cam surface is a pair of facing, spaced apart shoulders, said shoulders having steps in spacing and said shoulders define limits in relative movement of said contact between said shoulder.

7. The apparatus of claim 5 including means mounting said cam centered on an axis through said upper and lower end assemblies.

* * * * *